ID
United States
Blackburn et al.

4,164,650
Aug. 14, 1979

[54] MEANS FOR REDUCING NUCLEAR RADIATION-INDUCED FLUORESCENCE NOISE IN FIBER-OPTICS COMMUNICATIONS SYSTEMS

[75] Inventors: James C. Blackburn, Adelphi; Alan Bromborsky, Beltsville, both of Md.

[73] Assignee: The United States of America as represented by the Secretary of the Army, Washington, D.C.

[21] Appl. No.: 814,019

[22] Filed: Jul. 8, 1977

[51] Int. Cl.² .............................................. H04B 9/00
[52] U.S. Cl. ................................................... 250/199
[58] Field of Search ................ 250/199; 325/418, 421, 325/422, 452; 350/150

[56] References Cited

U.S. PATENT DOCUMENTS

| | | | |
|---|---|---|---|
| 3,091,740 | 5/1963 | Murphy, Jr. | 325/421 |
| 3,328,583 | 6/1967 | Davison | 250/199 |
| 3,351,761 | 11/1967 | Hamby et al. | 260/199 |
| 3,569,715 | 3/1971 | Horning | 250/199 |
| 3,579,145 | 5/1971 | De Lange | 250/199 |
| 3,788,743 | 1/1974 | George | 250/199 |
| 3,971,930 | 7/1976 | Fitzmaurice et al. | 250/199 |

*Primary Examiner*—Benedict V. Safourek
*Assistant Examiner*—Joseph A. Orsino, Jr.
*Attorney, Agent, or Firm*—Nathan Edelberg; Robert P. Gibson; Saul Elbaum

[57] ABSTRACT

Photons from nuclear radiation are absorbed by fiber optics and the material of the fibers have their energy levels elevated causing fluorescence. The fluorescence is a noise component which interferes with light signals axially passing through the fiber optics. By using a narrow bandwidth interference optical filter, centered about the communication frequency, the noise interference may be substantially reduced so that an acceptable signal-to-noise ratio is achieved. A tuned optical filter will compensate for drift of the center communication frequency.

6 Claims, 6 Drawing Figures

MEANS FOR REDUCING NUCLEAR RADIATION-INDUCED FLUORESCENCE NOISE IN FIBER-OPTICS COMMUNICATIONS SYSTEMS

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to light communication systems and more particularly to a filtering system for reducing the noise in fiber-optics communication systems subjected to nuclear radiation.

BRIEF DESCRIPTION OF THE PRIOR ART

The use of fiber optics in communications is well established. A major problem encountered in fiber optic communication results in the environment of nuclear radiation. The photons present in such radiation are absorbed by the fibers and the energy levels of the fiber material become elevated to an extent where fluorescence occurs. As will be appreciated, the fluorescence is a wideband interference with the light communication signals normally passing through the fiber optics. The result is a very low signal-to-noise ratio.

It has been found that nuclear radiation striking the fibers causes them to fluoresce, giving off wideband radiation peaked at short wavelengths of 500 nm and below.

BRIEF DESCRIPTION OF THE PRESENT INVENTION

The present invention is centered about two embodiments which are designed to serve as narrow band pass filters which will reject the noise outside the bandwidth of the communication signals. Thus, only the noise present within the band will interfere with the optical communication system thus greatly enhancing the signal-to-noise ratio at a photodetector which customarily converts the light signals passing through fiber optics to electrical signals. It is important that the signal-to-noise ratio at the photodetector be greatly improved since photodetectors are generally wideband response components.

In a first embodiment of the invention, a fixed tuned optical interference filter is used at the receiver end of a communication system and will improve the signal-to-noise ratio at the photodetector. However, a limitation to a fixed tuned approach lies in the fact that the light sources typically used at the transmitters of optical communication systems include cw laser diodes or other light sources which drift in wavelength in response to temperature changes and current drive levels. Thus, an arbitrarily narrow filter such as a fixed tuned filter will provide an extreme signal-to-noise ratio so long as the light source does not drift. Such an approach may fail to pass the desired signal as a consequence of signal drift from the nominal or center frequency of communication.

In order to rectify such a problem, a second embodiment of the present invention utilizes a tunable optical interference filter, known as an optical etalon. This tracking optical filter stays tuned to the frequency of the signal source, regardless of the drift of this source. Its bandpass may therefore be made extremely narrow in order to provide great noise rejection without regard to the slow drift in wavelength of laser or LED optical sources.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
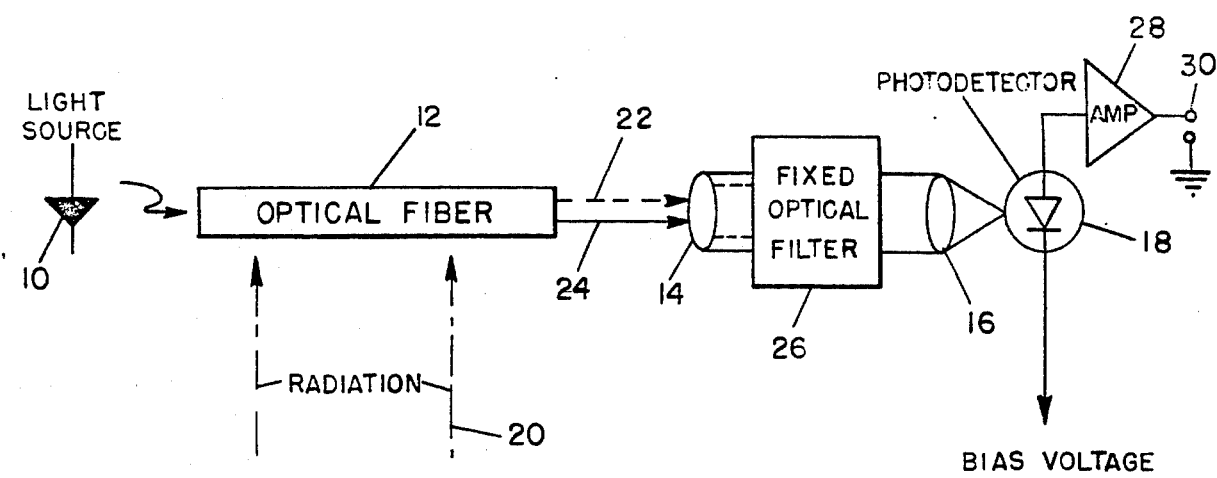
FIG. 1 is a diagrammatic illustration of a communication system in accordance with a first embodiment of the present invention using a fixed tuned optical interference filter.

Referring to the figures and more particularly FIG. 1, a light source 10 is indicated at a transmitting section of a communication system. The light source may be a laser or LED source.

An optical fiber 12 is indicated as having a first end adjacent the light source 10. It is to be understood that an optical fiber bundle may also be represented by reference numeral 12. A collimating lens 14 is positioned adjacent an opposite end of the optical fiber 12. Conventionally, a second lens 16 is employed to focus the communication signal from the optic fiber 12 and collimating lens 14 to a photodetector 18. As an example of a focusing lens 16, a double concave lens may be considered.

The present invention anticipates the problems of interference when nuclear radiation is within the environment of the optical fiber 12. This is indicated by the dotted radiation lines 20. As previously mentioned, photons from such radiation will be absorbed by the fibers and cause them to fluoresce due to elevated energy levels of the fiber material. It is this fluorescence that constitutes the interference noise which must be contended with if communications are to continue.

In order to cope with such interference, an optical filter 26 is positioned between the collimating lens 14 and the focusing lens 16. Since the photodetector 18 is a wideband responsive element, it is important to eliminate the interference and pass only the narrow bandwidth of the communication signal. Of course, in the event of fluorescent interference, a noise component will be present in the same frequency range of the communication signal but an adequately high signal-to-noise ratio will be obtained to allow satisfactory communication to exist.

In the first embodiment the optical filter 26 is a fixed tuned filter which does not track with drift of the communication signal. Such a filter may be of the type known as a dielectric interference optical filter which, by way of example, is distributed by Spectro-Film, Inc. of Winchester, MA. The selection of the wavelength of the filter should be the same as the nominal or center frequency of communication. A conventional photodetector 18 is positioned adjacent the lens 16 for converting light signals to electrical signals. The photodetector 18 has a first terminal thereof connected to a bias voltage and an opposite terminal connected to an output 30, via an amplifier 28. The output at 30 permits the communication signal developed by light source 10 to be converted to a received electrical signal. Although such an embodiment will provide satisfactory results if the temperature and current drive to the light source remain the same, as often is the case, there is a drift in wavelength in response to temperature changes and current drive levels. Thus, an arbitrarily narrow filter will provide an extreme signal-to-noise ratio as long as the light source does not drift, but may fail to pass the desired signal as a consequence of signal drift from the nominal or center communication frequency. In order to obviate this problem, a different type of filter is utilized to track frequency drift of the source and is explained in connection with FIG. 2. It is contemplated that an appropriate tracking filter be made with a tunable optical etalon. This type of tracking optical filter maintains itself tuned to the frequency of the signal source, regardless of the drift of the source. Its bandpass may therefore be extremely narrow in order to provide excellent noise rejection without regard to the slow drifts in frequency of laser, LED or similar optical sources.

The tunable optical etalon filter is, per se, a prior art device. It has the ability to shift its center frequency in accordance with an electrical tuning signal which causes a transparent piezoelectric layer or layers to physically shift several wavelengths in accordance with a tuning or tracking signal. Such an etalon filter is available from Spectra-Physics, Inc. and is identified as a tunable Fabry-Perot etalon. The tracking signal is provided by a tuning circuit which is connected between the output of photodetector 18 and the tracking optical filter.

Figure 2:
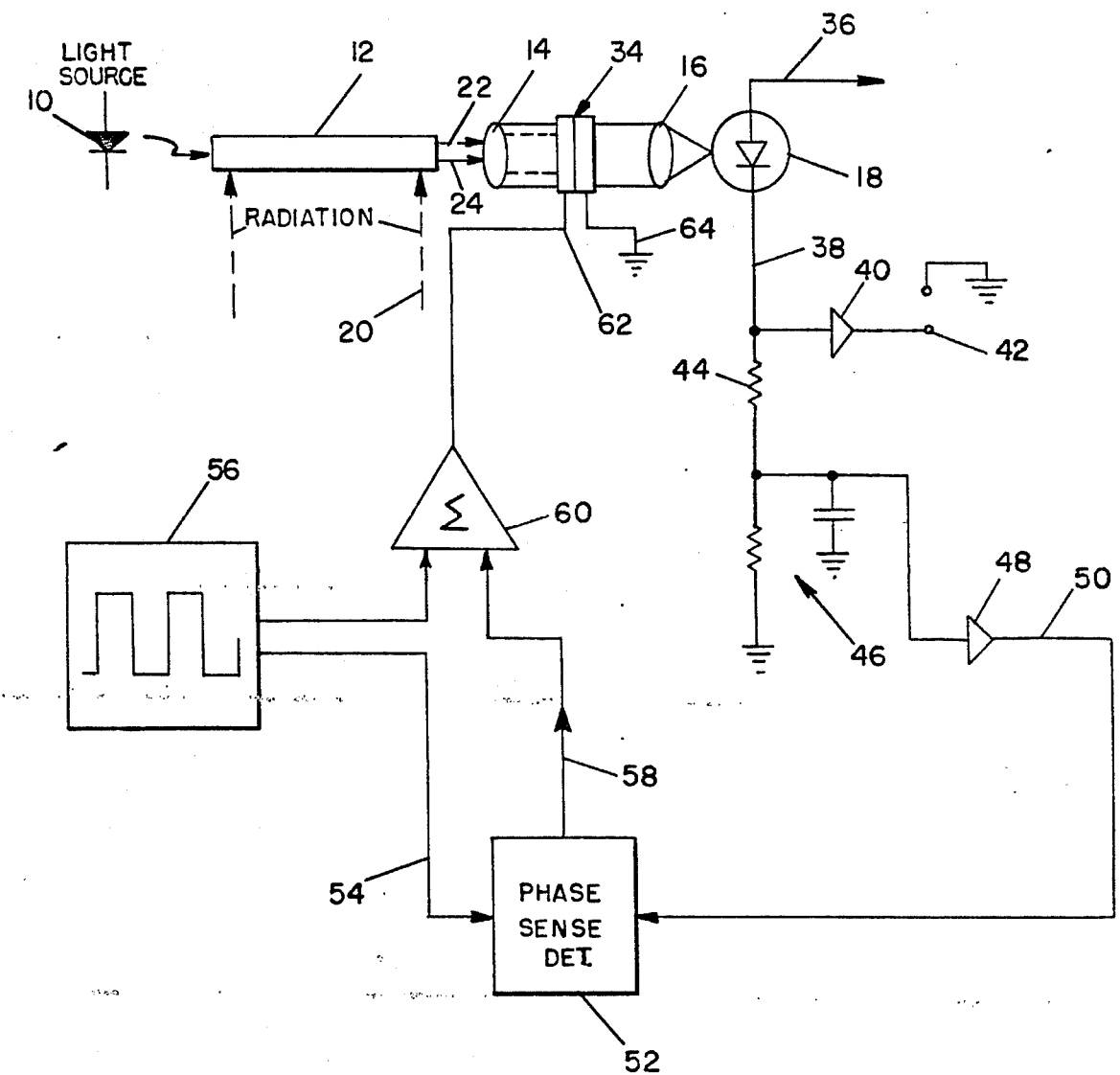
FIG. 2 is a schematic diagram of a communication system in accordance with a second embodiment of the present invention using a tunable optical interference filter.

The tuning circuit is shown in greater detail in FIG. 2. The light source 10 and optical fiber 12 are the same as previously mentioned in connection with FIG. 1. Other similar components as explained in connection with FIG. 1 are likewise numbered in FIG. 2. Filtered light passing through the tunable optical filter 34 is focused by lens 16 onto a photodetector 18. A bias voltage is provided along the anode line 36 while the signal from the photodetector is provided along cathode line 38 to the input of a high frequency signal amplifier 40. The amplified signal is made available at terminal 42. Line 38 from the photodetector 18 is fed through the resistor 44 to a low pass RC filter generally indicated at 46 which integrates the signal from the photodetector. It is this low pass filter which forms the front end of the tuning circuit for the tunable optical filter 34. An amplifier 48 amplifies the average signal or integrated signal derived from the low pass filter 46 and amplifier output line 50 is provided as a first input to the phase-sensitive detector 52, which is a conventional component. A second input to the phase-sensitive detector 52 occurs along input line 54 and is derived from an A.C. generator 56 which, by way of example, generates a square wave "dither" signal. A correction signal will occur at the output line 58 of the phase-sensitive detector depending upon the signal from lead 50 and the reference signal along lead 54. The type of correction signal occurring on lead 58 will be explained in greater detail hereinafter, in connection with FIGS. 3a–3d.

The dither signal from generator 56 is provided to the summing amplifier 60, along with the correction signal appearing on line 58. The summed signal from the output of summing amplifier 60 is fed to a first electrical terminal 62 of the summing amplifier 60, the second terminal 64 being grounded. The output from the summing amplifier 60 will be such that it tunes the optical filter 34 to the desired center communication frequency. In order to appreciate this, reference is made to FIGS. 3a–3d which indicate timing diagrams relative to the phase-sensitive detector 52.

Figure 3A:
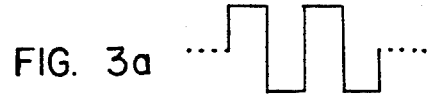
FIGS. 3a, 3b, 3c and 3d are timing diagrams relating to keypoints in the circuit of FIG. 2.

FIG. 3a illustrates the dither signal which is generated to alternately tune the optical filter 34 to a slightly longer and then slightly shorter wavelength than its center wavelength. This is done at a low frequency. Depending on the relative wavelength between the optical filter 34 and the light source 10, the phase-sensitive detector 52 will produce a +, 0, or − signal. This signal is applied (by the summing amplifier 60) as a D.C. tuning correction.

Figure 3B:
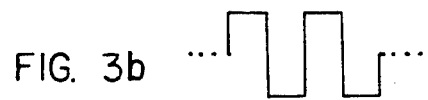
Figure 3C:
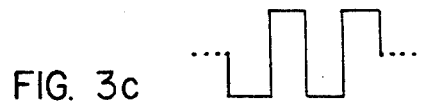
Figure 3D:
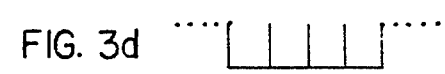

FIG. 3b illustrates the average signal to the phase-sensitive detector 52, derived along line 50, when the light source 10 is operating at a frequency above a previous center frequency. It is noticed that there is an in-phase relationship between the signal in FIG. 3b and the dither signal shown in FIG. 3a. However, when the light source 10 is operating at a frequency lower than a previous center frequency, there is a 180 degree phase shift relationship between the dither signal of FIG. 3a and the average signal along line 50, as shown in FIG. 3c. Referring to FIG. 3d, should the average signal present at line 50 indicate that the light source 10 is operating at a previous center frequency, the average signal representing an output at a single level will be as shown.

By multiplying the dither signal and the average signal together in the phase-sensitive detector 52, we synchronously rectify the average signal and obtain a +, −, or 0 output depending on how the source is shifting its center communication frequency.

The tuning signal applied at terminal 62 will depend upon the polarity of the signal from summing amplifier 60 and the magnitude of such a signal. This, of course, will depend upon which direction the light source is drifting from a previously operating center communication frequency and how great such a drift is at a particular point in time.

We wish it to be understood that we do not desire to be limited to the exact details of construction shown and described, for obvious modifications can be made by a person skilled in the art.

We claim the following:

1. An optical filtering apparatus for a light communication system comprising:
    a light source having a center communication frequency subject to frequency drift;
    optical fiber means having a first end thereof located adjacent the light source, the length of the optical fiber means being subjected to externally impinging energy which generates noise in the fiber means;
    a tunable optical filter located at the second end of the optical fiber means for filtering a light source signal and rejecting the noise, the filter having electrical input means for varying a center frequency of the filter;
    photodetection means located at an output of the filtering means for converting the filtered light signal to an electrical signal; and
    tuning circuit means responsive to the center frequency of the light source for shifting the center frequency of the filter to coincide with that of the center frequency of the light source, the tuning circuit means having an input connected to the photodetection means and having an output connected to the electrical input means.

2. The subject matter set forth in claim 1 wherein the tunable optical filter is a Fabry Perot etalon filter.

3. The subject matter set forth in claim 2 wherein the tuning circuit means comprises:

integrating means for generating an average signal produced by the photodetector;

phase-sensitive detecting means having a first input connected to the output of the integrating means, a second input of the phase-sensitive detecting means connected to an A.C. signal generator, the output of the phase-sensitive detecting means generating a correction signal dependent upon the input of the first and second inputs; and summing means having inputs connected to the A.C. signal generator and the phase-sensitive detecting means for generating a signal at its output which is fed to the electrical input means of the etalon filter for tuning the filter to the center frequency of the light source.

4. The subject matter set forth in claim 3 wherein the integrating means is a low-pass filter.

5. The subject matter set forth in claim 4 wherein the A.C. signal generator generates a relatively low frequency squarewave function.

6. The subject matter set forth in claim 5 wherein the photodetecting means is an optical detecting diode.

* * * * *